March 26, 1946.  D. P. COOPER, JR  2,397,243
OPHTHALMIC DEVICE
Filed Oct. 16, 1942
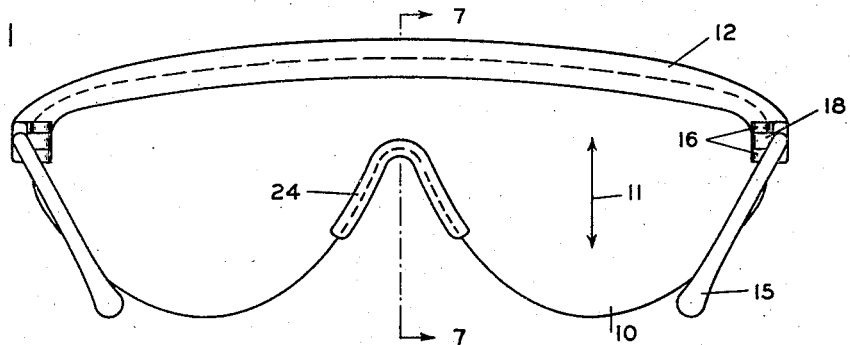
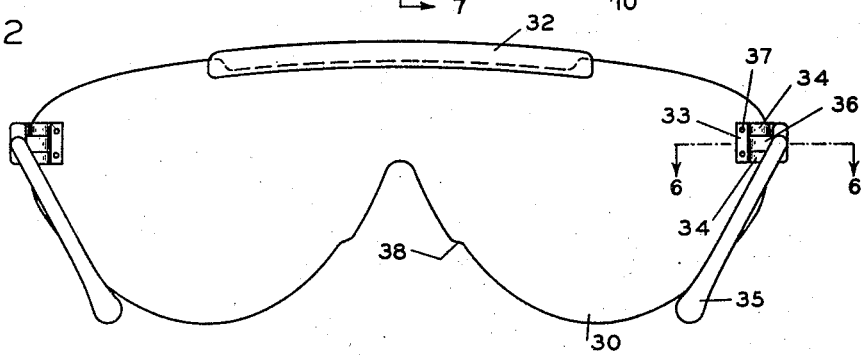
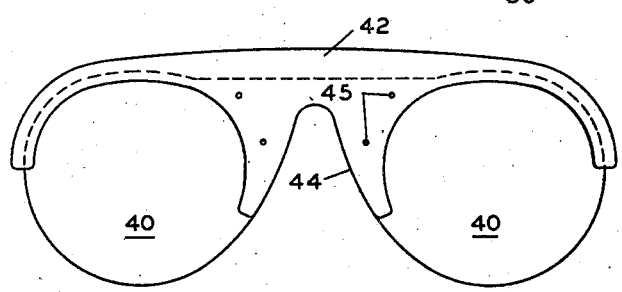
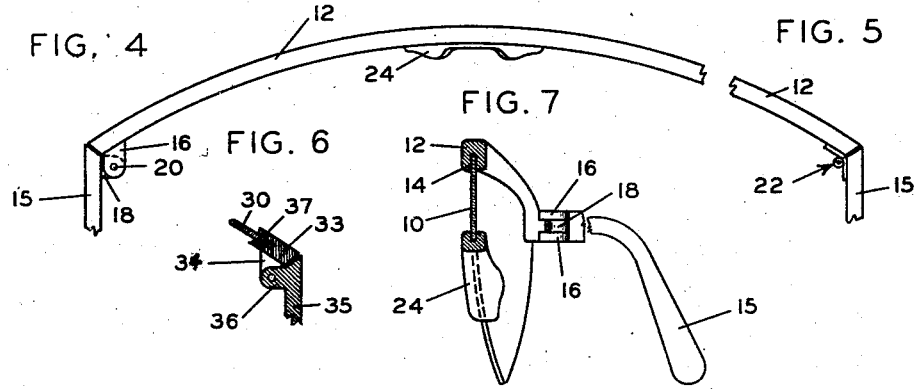
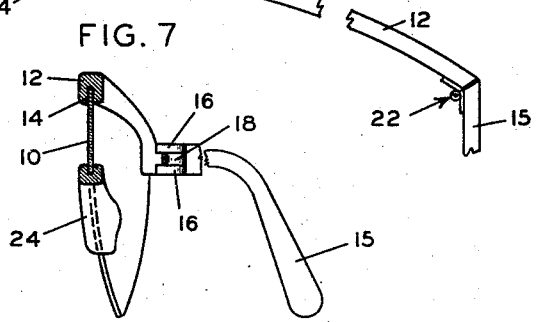
INVENTOR.
Dexter P. Cooper, Jr.,
BY Donald L. Brown
Attorney Patented Mar. 26, 1946

2,397,243

UNITED STATES PATENT OFFICE 2,397,243

OPHTHALMIC DEVICE

Dexter P. Cooper, Jr., Cambridge, Mass., assignor to Polaroid Corporation, Cambridge, Mass., a corporation of Delaware Application October 16, 1942, Serial No. 462,259

3 Claims. (Cl. 88—41)

This invention relates to ophthalmic devices such as eyeglasses and goggles, and more particularly to eyeglasses and goggles for the protection of the eyes against glare or overbright light.

It is one object of the present invention to provide a novel form of goggles wherein the frame portion is reduced to a minimum, and which is accordingly both light in weight and cheap to manufacture.

Another object is to provide such a goggle which utilizes sheet plastic material for the lens portions.

A further object is to provide such a goggle wherein the main portion comprises transparent, sheet plastic material defining the two lens portions and having mounted thereon one or more additional elements serving to reinforce said sheet material and to provide means for mounting temples thereon.

A still further object is to provide such a goggle with a preformed curved configuration adapted to fit the wearer with a maximum degree of comfort as well as to lessen rearward reflection of light incident thereon from behind the wearer.

Additional objects are to provide such a goggle wherein the aforementioned reinforcing elements may be formed from molded plastic material; to provide such a goggle wherein one of said reinforcing elements is adapted to engage the nose of the wearer; to provide such a goggle wherein the two lens portions are integrally formed from a single sheet of transparent plastic material; and to provide such a goggle wherein the lens portions are formed of dichroic, light-polarizing material.

Other objects and advantages will in part be apparent and in part be pointed out in the course of the following description of several embodiments of the invention, which are given as non-limiting examples, in connection with the accompanying drawing, in which:

Figure 1 is a rear view of a goggle or sunglass embodying one form of the invention;

Figure 2 is a rear view of a modification of the embodiment of the invention shown in Fig. 1;

Figure 3 is a front view of a goggle or sunglass embodying another form of the invention;

Figure 4 is a partial plan view of the embodiment of the invention shown in Fig. 1;

Figure 5 is a detail view similar to Fig. 4 and showing a different hinged construction between the temple and goggle frame;

Figure 6 is a detail view in section along the line 6—6 in Fig. 2; and

Figure 7 is a section on the line 7—7 in Fig. 1.

In Fig. 1, element 10 comprises a sheet of any suitable light-transmitting plastic material shaped or cut to provide a pair of lens portions defining a conventional nose-engaging recess therebetween. In a preferred form of the invention, sheet 10 will comprise light-polarizing, sheet plastic material, such for example as any of the sheet plastic materials sold under the trade name "Polaroid." If sheet 10 comprises polarizing material, it will preferably be arranged with its transmission axis substantially vertical, as indicated by arrow 11, in order that it may serve to absorb glare-producing light polarized by reflection from horizontal surfaces. Alternatively, sheet 10 may comprise any other suitable sheet plastic material such as cellulose acetate, and may have any desired light-absorbing dye incorporated therein, such for example as a red or a green dye. Preferably sheet 10 may be provided with optically smooth surfaces.

Sheet 10 is provided along its upper edge with a reinforcing bar 12 of any suitable material, preferably a moldable plastic material such, for example, as cellulose acetate or methyl methacrylate. As is shown more clearly in Fig. 7, bar 12 is provided with a slot 14 adapted to receive the upper edge of sheet 10. It will be understood that sheet 10 may be cemented within slot 14 by means of any suitable adhesive, or in an alternative construction bar 12 may initially be molded in position around the edge of sheet 10 and thereby secured thereto. As is shown more clearly in Fig. 4, bar 12 is preferably provided with a preformed, curved shape in order that it may fit more smoothly to the wearer's face. This also serves to shape or curve sheet 10 more smoothly about the wearer's face and to prevent light incident on the lens portions thereof from behind the wearer from being reflected into the wearer's eyes.

In the embodiment of the invention shown in Fig. 1, bar 12 serves also to provide means for securing temples 15 to the goggle. For example, bar 12 may be provided with an integrally formed fork 16 adapted to engage a complementary tongue 18, which may be integrally formed on each of temples 15. Hinge pin 20 completes this assembly. This construction is simple and therefore particularly advantageous for the purposes of the present invention, since it substantially reduces the labor of manufacture. An alternative construction is shown in Fig. 5 and comprises a conventional metal hinge 22. A nose-engaging element 24 may also be provided for attachment to sheet 10 within the nose-engaging recess defined by the two lens portions thereof. Element 24 may be formed of any suitable material, such preferably as the same material as bar 12, and may be secured to sheet 10 in the same way as bar 12, as is shown more clearly in Fig. 7.

Fig. 2 shows a modification of the embodiment of the invention shown in Fig. 1. Sheet 30 corresponds to sheet 10 in Fig. 1, and bar 32 corresponds to bar 12, but it will be noted that it is substantially shorter than bar 12. There may also be provided a pair of additional reinforcing members 33 which may be of the same material as bar 32 and may have integrally formed forks 34 serving as hinge means in combination with temples 35 and tongues 36 thereon, as explained above in connection with Fig. 1. Elements 33 may be secured to sheet 30 in the same manner as bar 12 or bar 32, or this connection may be reinforced by rivets or grommets 37, as is shown more clearly in Fig. 6. It will be noted also that in the embodiment of the invention shown in Fig. 2, there is no separate nosepiece, which construction may in some cases be desirable. Sheet 30, however, is preferably cut away as indicated at 38 in order to provide clearance between the lower edges thereof and the face of the wearer.

In the further embodiment of the invention shown in Fig. 3, sheet 40, forming the lens portions of the goggle, corresponds to sheets 10 and 30. Reinforcing bar 42 is similar in length to bar 12, but also has formed integrally therewith a nose-engaging portion 44. It will be understood that in this embodiment of the invention the slot within the reinforcing element corresponding to slot 14 in Fig. 7 will be relatively deep, and it may in some cases be advantageous to reinforce the connection to sheet 30 by means of rivets or grommets 45.

The embodiment of the invention last described is subject to many further modifications. For example, top bar portion 42 may have temples mounted thereon as in the embodiment of the invention shown in Fig. 1, or it may be shorter, resembling bar 32 in construction, in which case the temples may be mounted on sheet 40 as explained above in connection with Figs. 2 and 6. In a further modification of this form of the invention, the lens portions may be separate, in which case the slot within nose-engaging portion 44 may be relatively shallow. Many similar modifications of this and the other embodiments of the invention described will be apparent to those skilled in the art, and are to be construed as coming within the scope of the invention.

Since certain changes may be made in the above construction and different embodiments of the invention could be made without departing from its scope, it is intended that all matter contained in the above description or shown in the accompanying drawing shall be interpreted as illustrative and not in a limiting sense.

It is also to be understood that the following claims are intended to cover all the generic and specific features of the invention herein described, and all statements of the scope of the invention which, as a matter of language, might be said to fall therebetween.

What is claimed is:

1. In an ophthalmic device having a normally flat, deformable thin sheet of transparent plastic material shaped to provide a pair of integral lens portions having a nasal recess therebetween and having the upper edge thereof generally convex in shape, in combination, a relatively rigid reinforcing bar, said bar being provided with curved means engaging the upper marginal edge of said sheet whereby to flex the sheet to the general curvature of the human face and to retain the sheet in a flexed condition wherein the face of the sheet adjacent the face of the wearer is generally concave, said bar curving downwardly from its center towards its ends and extending downwardly and engaging the outer marginal edges of said sheet which are nearest the sides of the face of the wearer for a distance sufficient to reinforce the sheet along such marginal edges and forming hinge connection means adjacent the ends of the bar, and temple means for holding the device in position on the face of the wearer hingedly connected to the hinge connection means formed adjacent the ends of the bar.

2. In an ophthalmic device having a normally flat, deformable thin sheet of transparent plastic material shaped to provide a pair of integral lens portions having a nasal recess therebetween and having the upper edge thereof convex in shape, and also having temple means associated therewith for holding said device in position before the eyes of the wearer, in combination, a relatively rigid reinforcing bar of a plastic material permanently curved to conform substantially to the general curvature of the face of the wearer of said device, said bar having a sheet-engaging portion comprising a slot extending longitudinally of the bar in the under side thereof, said slot in plan being of concave shape to conform generally to the curvature of the face of the wearer of said device and in elevation also being concave to conform to the upper edge of said sheet, the upper edge of said sheet being secured within said slot and permanently held therein in face-conforming curvature, and additional lens reinforcing means spaced from said bar and affixed to said sheet adjacent the recess therein and comprising plastic material shaped to provide rearwardly extending nose-engaging pads.

3. An ophthalmic device comprising, in combination, a relatively long bar of plastic material adapted to extend across the face and to have its center above the eyes of a wearer of said device, temple means hinged to said bar for holding the device in position on the face of the wearer, lens means comprising a normally flat, deformable, thin sheet of transparent plastic material having a pair of lens portions integral with a bridge portion, said sheet adjacent the bridge portion and between said lens portions having a nasal recess, said bar being provided with means engaging the upper edge of said sheet whereby to flex the sheet to the general curvature of the human face and to retain the sheet in such flexed condition, said bar curving downwardly from its center towards its ends with each end of the bar located opposite a position at the side of the face which is below the center of the bar when the device is in use, and additional lens reinforcing means spaced from said bar and fixed to said sheet along the edges of the nasal recess comprising plastic material formed to provide a pair of rearwardly extending nose-engaging pads which provide substantially unobstructed vision through the bridge portion of said sheet, the lower edge of said sheet being otherwise free of reinforcing material.

DEXTER P. COOPER, Jr.